United States Patent
Jones et al.

(10) Patent No.: US 6,363,254 B1
(45) Date of Patent: *Mar. 26, 2002

(54) SYSTEM AND METHOD FOR ENCIPHERING AND COMMUNICATING VEHICLE TRACKING INFORMATION

(75) Inventors: Martin Kelly Jones, Dalton; David Clarke Hicks, Marietta, both of GA (US)

(73) Assignee: Global Research Systems, Inc., Rome, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,606

(22) Filed: Sep. 30, 1998

(51) Int. Cl.$^7$ ................................. H04Q 7/20
(52) U.S. Cl. .................. 455/456; 701/208; 701/201
(58) Field of Search ................ 455/456, 457, 455/414, 415, 226.1; 701/213, 204, 214, 215, 301, 208

(56) References Cited

U.S. PATENT DOCUMENTS

| | | | | | |
|---|---|---|---|---|---|
| 5,394,333 A | * | 2/1995 | Kao | ............................ | 364/450 |
| 5,552,795 A | * | 9/1996 | Tayloe | ......................... | 342/357 |
| 5,625,668 A | * | 4/1997 | Loomis | ........................ | 379/58 |
| 5,732,074 A | * | 3/1998 | Spaur | .......................... | 370/313 |
| 5,751,245 A | * | 5/1998 | Janky | .......................... | 342/357 |
| 6,012,013 A | * | 1/2000 | McBurney | .................. | 701/207 |
| 6,104,978 A | * | 8/2000 | Harrison | ..................... | 701/207 |
| 6,124,810 A | * | 9/2000 | Segal | .......................... | 340/994 |

* cited by examiner

Primary Examiner—Daniel Hunter
Assistant Examiner—Nick Corsaro
(74) Attorney, Agent, or Firm—Thomas, Kayden, Horstemeyer & Risley, LLP

(57) ABSTRACT

A tracking system determines the global coordinates of a vehicle being monitored by a monitoring mechanism located at a base station. The global coordinates are translated into coordinate values relative to a local reference point selected by the system. The translated coordinate values are transmitted to the monitoring mechanism in lieu of the global coordinates initially determined by the system. The monitoring mechanism is aware of the local reference point selected so that the monitoring mechanism can determine the vehicle's location relative to the local reference point selected, another reference point, or a global reference point used to define the global coordinates. The local reference point selected to translate the global coordinates can be changed as long as the translation mechanism and the monitoring mechanism are aware of the change. Transmitting the location of the vehicle relative to the local reference point rather than relative to the global reference point can make it more difficult for unauthorized users to determine the location of the vehicle and can reduce the amount of data required to transmit the vehicle's location.

38 Claims, 5 Drawing Sheets

SYSTEM AND METHOD FOR ENCIPHERING AND COMMUNICATING VEHICLE TRACKING INFORMATION

BACKGROUND OF THE INVENTION

1. Field of the Invention

The present invention generally relates to communications systems and, in particular, to a system and method for enciphering and communicating vehicle tracking information to a base station that notifies a user of a particular location of a vehicle.

2. Related Art

A vehicle tracking system is disclosed in co-pending U.S. Patent Application entitled "Advance Notification Systems and Methods Utilizing a Computer Network," filed May 6, 1997, and assigned Ser. No. 08/852,119, which is incorporated herein by reference. In this system, each vehicle is equipped with a sensor (e.g., a global positioning system (GPS) sensor) to determine the vehicle's location relative to a predetermined reference point. For example, in using GPS technology, each sensor receives signals from GPS satellites indicating the global latitude and longitude coordinate values of the sensor from the Earth's zero degree latitude and zero degree longitude location (i.e., at the intersection of the equator and the prime meridian). Typically, the latitude coordinate value and the longitude coordinate value transmitted from the GPS satellite are each thirty-two bit words of digital data.

Each vehicle associated with the tracking system transmits its location (i.e., transmits the thirty-two bit coordinate values received from the GPS satellite) and other information to a base station. The base station includes a processor to receive the coordinate values of each vehicle and to monitor the location and status of each vehicle. When the travel data communicated from a particular vehicle indicates that the vehicle reached a predetermined location (e.g., a certain distance from a destination of the vehicle), the base station sends a message to the vehicle's destination in order to indicate the vehicle's impending arrival. The message can be via telephone, pager, computer modem or other known mediums of communication.

Upon receipt of the message, a user at the destination can prepare for the vehicle's impending arrival. As an example, if the vehicle is a school bus, the base station can send a message via telephone to each student assigned to the school bus, when the school bus is within five minutes of the respective student's home. Consequently, the students do not need to wait at the pick-up point (sometimes in adverse weather conditions) for an extended length of time when the school bus is late relative to the school bus' normal schedule.

Other applications include using the tracking system to determine the location of delivery vehicles such as overnight letter carriers or armored trucks, which typically carry valuable cargo. The position of the delivery vehicle can be monitored by the base station, and the destination can be notified when the vehicle will arrive. Furthermore, the tracking system can provide an extra level of security when the vehicle is hijacked or stolen. By monitoring the location of the vehicle at the base station, the travel data communicated to the base station can be used to help law enforcement personnel locate the vehicle.

However, the transmissions from the vehicle to the base station create a number of problems. For example, the transmission signals can be intercepted by unauthorized users. These users may then use the travel data in undesirable ways, which are contrary to the interest of the authorized users. As an example, the travel data of an armored truck may be intercepted by an unauthorized user to determine the truck's location in order to facilitate a hijacking of the truck.

Although the transmission signals may be encrypted, encryption is oftentimes insufficient to adequately protect the privacy of the signals being transmitted. As known in the art, if an unauthorized user obtains enough samples, then the user can break the encryption and interpret the signals. A user can gather enough sample points to break the encryption by simply monitoring a location where the vehicle normally travels or by following the vehicle while the vehicle is transmitting data. Therefore, the transmissions from the vehicle to the base station create security concerns for the authorized users of the tracking system.

In addition, another problem associated with the communication of travel data from a vehicle to a base station is the large number of data bits required to communicate the vehicle's position. In this regard, communication is oftentimes achieved over cellular channels, and cellular providers normally bill based on the number of data packets transmitted. Each data packet typically enables the communication of a finite number of data bits. For example, many current cellular communication systems transmit thirty-two bits of data in each data packet. Accordingly, each transmission of the vehicle's location requires more than one data packet, since each coordinate value associated with the GPS system is typically thirty-two bits long and since two coordinates values are transmitted for each location. It is desirable for the length of the data message communicating the vehicle's location to be reduced so that communication expenses can be minimized. If each coordinate value can be reduced to sixteen bits or less, then the two coordinate values indicating the vehicle's position can be transmitted with one data packet, as long as the data packet allows at least thirty-two bits of data.

Thus, a heretofore unaddressed need exists in the industry for a tracking system and method for safely transmitting a vehicle's location and for reducing a number of data bits used to indicate the vehicle's position.

SUMMARY OF THE INVENTION

The present invention overcomes the inadequacies and deficiencies of the prior art as discussed herein. The present invention provides a system and method for safely and efficiently communicating vehicle tracking information to a base station that notifies a user of a particular location of a vehicle.

In a broad sense, the present invention utilizes a sensor, a translation mechanism, and a monitoring mechanism. The sensor determines position values that represent a location of a vehicle relative to a first reference point. The translation mechanism receives the position values and translates the position values into translated values representing a location of the vehicle relative to a second reference point. The translation mechanism then transmits the translated values to a monitoring mechanism that tracks the vehicle based on the translated values received from the translation mechanism.

In accordance with another feature of the present invention, the translation mechanism mathematically combines the coordinate values of the second reference point with the position values to determine the translated values. In order to determine the vehicle's position relative to the first reference point, the monitoring mechanism mathematically combines the second reference point with the translated values received from the translation mechanism.

In accordance with another feature of the present invention, the location of the second reference point can be changed to further frustrate and confuse attempts to interpret the data transmissions.

The present invention can also be viewed as providing a method for communicating vehicle tracking information. Briefly described, the method can be broadly conceptualized by the following steps: determining coordinate values that indicate a location of a vehicle relative to a first reference point; translating the coordinate values to provide new coordinate values that indicate a location of the vehicle relative to a second reference point; transmitting the new coordinate values to a monitoring mechanism monitoring the vehicle; and determining a location of the vehicle relative to a predetermined location based on the new coordinate values.

The present invention has many advantages, a few of which are delineated hereafter, as mere examples.

An advantage of the present invention is that attempts by unauthorized users to interpret data transmissions associated with a vehicle tracking system are frustrated and confused.

Another advantage of the present invention is that the amount data transmitted in a vehicle tracking system can be reduced.

Another advantage of the present invention is that costs associated with a vehicle tracking system can be reduced.

Another advantage of the present invention is that it is simple in design and easily implemented.

Another advantage of the present invention is that it can be implemented in software, hardware, or a combination thereof.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
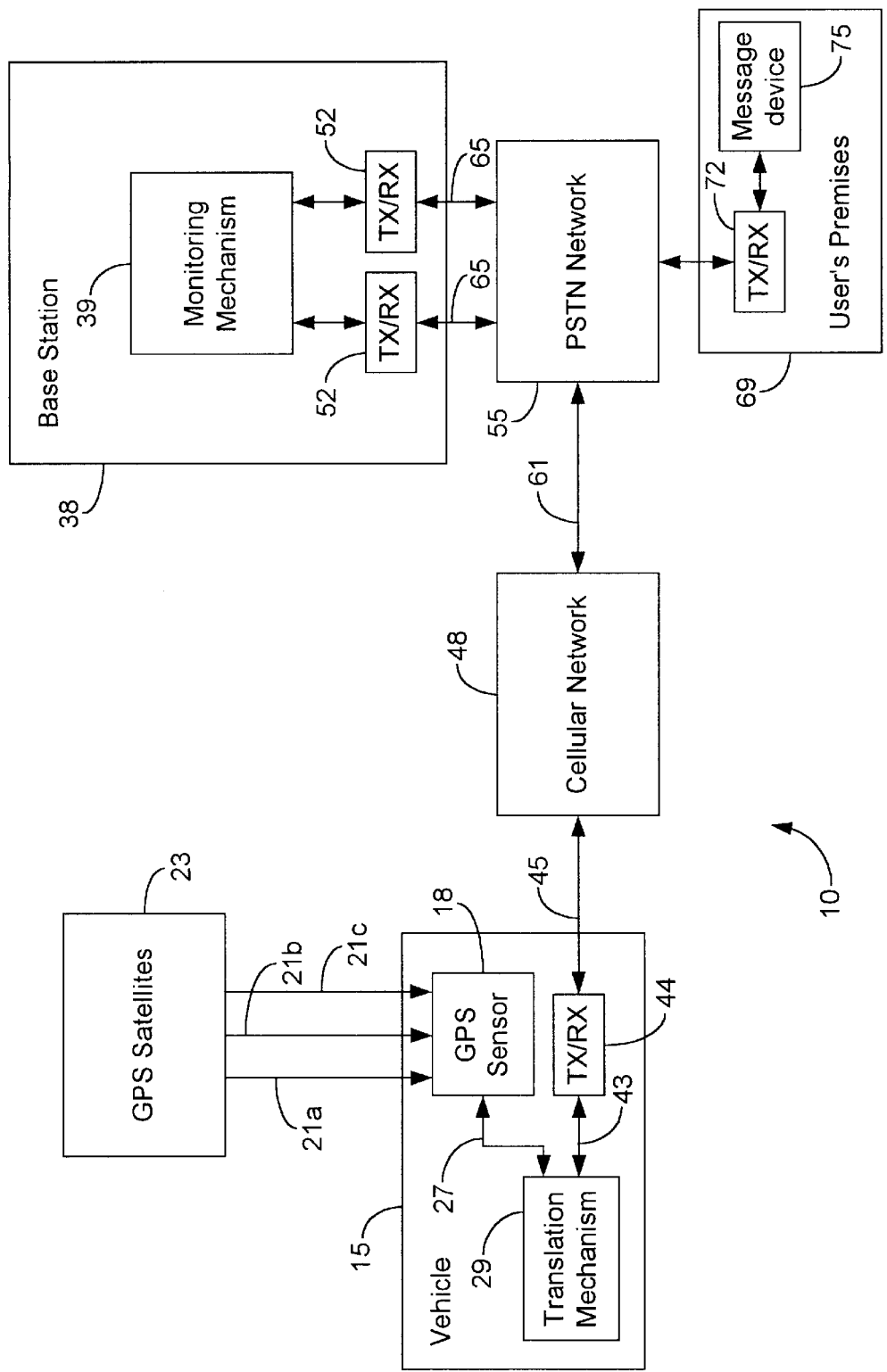
FIG. 1 is a block diagram illustrating a tracking system in accordance with the preferred embodiment of the present invention.

FIG. 1 depicts a tracking system 10 illustrating the principles of the present invention. Referring to FIG. 1, vehicle 15 is located at a particular location on the Earth's surface, and sensor 18 is configured to determine the vehicle's location relative to a predetermined reference point. For example, in the preferred embodiment, sensor 18 is a global positioning system (GPS) sensor coupled to vehicle 15. Therefore, sensor 18 is configured to receive a plurality of signals 21a, 21b, and 21c from a plurality of GPS satellites 23. Through techniques known in the art, sensor 18 is designed to analyze signals 21a, 21b, and 21c in order to determine the sensor's global coordinate values. U.S. Pat. No. 5,781,156 entitled "GPS Receiver and Method for Processing GPS Signals" and filed on Apr. 23, 1997, by Krasner, which is hereby incorporated herein by reference, discusses the processing of GPS signals 21a–21c received from GPS satellites 23 in order to determine the global coordinate values of the sensor 18.

As used herein, the term "global coordinate values" refers to values that indicate the sensor's location relative to a predetermined reference point, which is referred to herein as the "global reference point." Therefore, when GPS technology is utilized, as in the preferred embodiment, the global coordinate values are the coordinate values (ie., latitude and longitude values) relative to the Earth's zero degree latitude and zero degree longitude reference point. This reference point is located at the intersection of the equator and the prime meridian and is the global reference point for GPS systems. Since the sensor 18 is located within vehicle 15, the coordinate values determined by the sensor 18 are assumed to match the coordinate values of the vehicle 15.

It should be noted that technologies other than GPS may be utilized to determine the vehicle's global coordinate values, which may be located at other points besides the intersection of the equator and prime meridian. For example, it may be possible to determine the vehicle's position in response to transmissions from cellular towers instead of GPS satellites 23. Any system for determining the vehicle's position relative to a global reference point (i.e., a predetermined location) is sufficient for implementing the principles of the present invention.

It should be further noted that the term "coordinate values" shall be defined herein to mean any value or set of values that may be used to determine a location of a point. These values may be grid values, polar values, vector values or any other type of values known in the art for indicating locations of points.

Sensor 18 is designed to transmit a signal 27 to translation mechanism 29 indicating the vehicle's global coordinate values. Typically, in GPS systems, both the latitude and the longitude coordinate values of signal 27 generated by sensor 18 are each thirty-two bits. Translation mechanism 29 is configured to receive signal 27 and to monitor the vehicle's location over time by processing multiple signals 27. The translation mechanism 29 can be implemented in software, hardware, or a combination thereof In the preferred embodiment, as illustrated by way of example in FIG. 2, the translation mechanism 29 of the present invention along with its associated methodology is implemented in software and stored in computer memory 30a of a computer system 31. Also stored in memory 30a is an origin selection algorithm 32, which will be described in further detail hereinbelow. Note that the translation mechanism 29 and/or the origin selection algorithm 32 can be stored and transported on any computer-readable medium for use by or in connection with a computer-readable system or method. In the context of this document, a computer-readable medium is an electronic, magnetic, optical, or other physical device or means that can contain or store a computer program for use by or in connection with a computer-related system or method. As an example, the translation mechanism 29 may be magnetically stored and transported on a conventional portable computer diskette.

Figure 2:
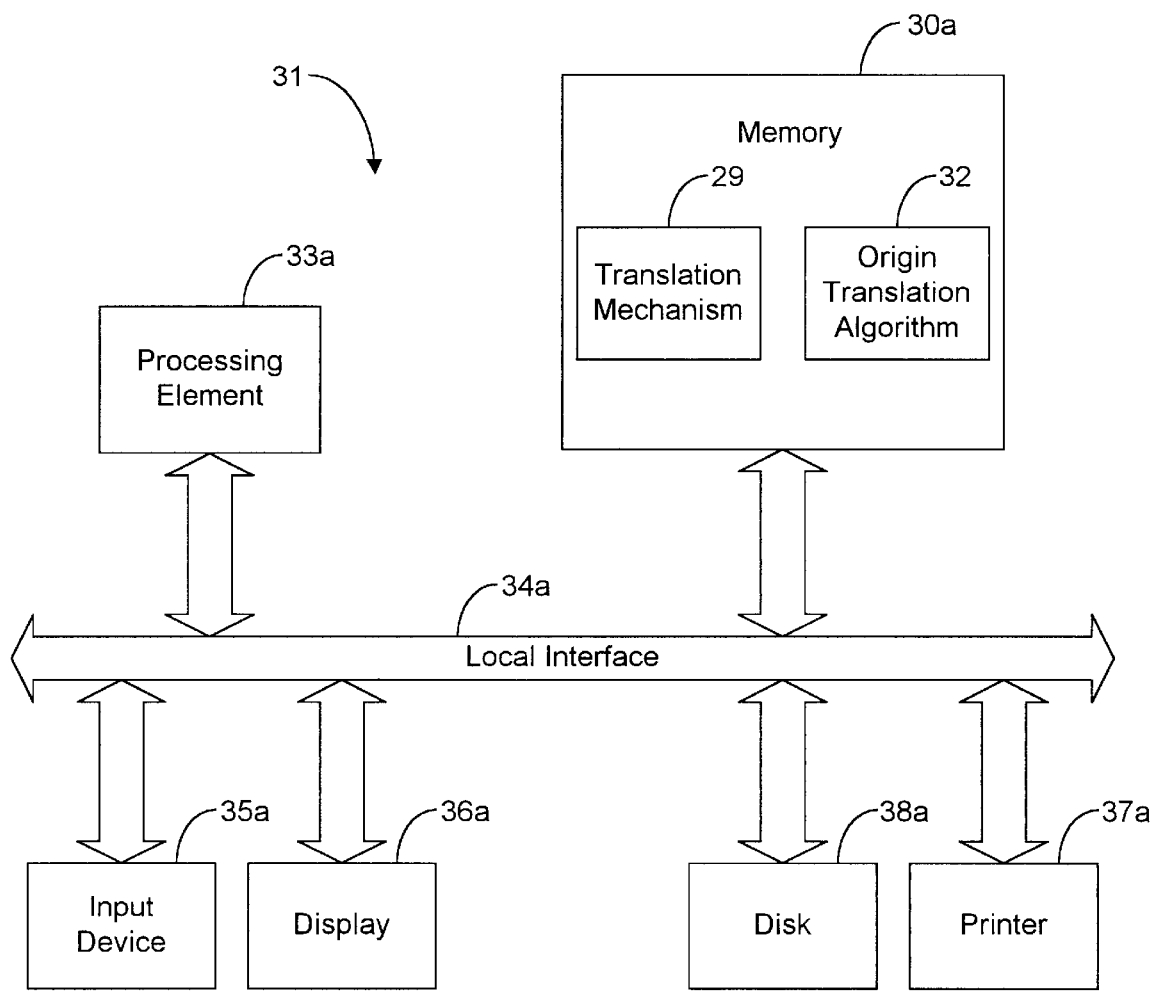
FIG. 2 is a block diagram illustrating an implementation of the translation mechanism of FIG. 1 in accordance with the preferred embodiment of the present invention.

The preferred embodiment of the computer system 31 of FIG. 2 comprises one or more conventional processing elements 33a, such as a digital signal processor (DSP), that communicate to and drive the other elements within the system 31 via a local interface 34a, which can include one or more buses. Furthermore, an input device 35a, for example, a keyboard or a mouse, can be used to input data from a user of the system 31, and screen display 36a or a printer 37a can be used to output data to the user. A disk storage mechanism 38a can be connected to the local interface 34a to transfer data to and from a nonvolatile disk (e.g., magnetic, optical, etc.).

The translation mechanism 29 is preferably configured to maintain a database of travel data. The travel data includes the vehicle's location information as well as any other desirable information. For example, when vehicle 15 is a delivery vehicle, translation mechanism 29 can include a list of items to be delivered and indicate which deliveries have been successfully attempted, which deliveries have been unsuccessfully attempted, and which deliveries remain to be attempted, and other vehicle status information.

Figure 3:
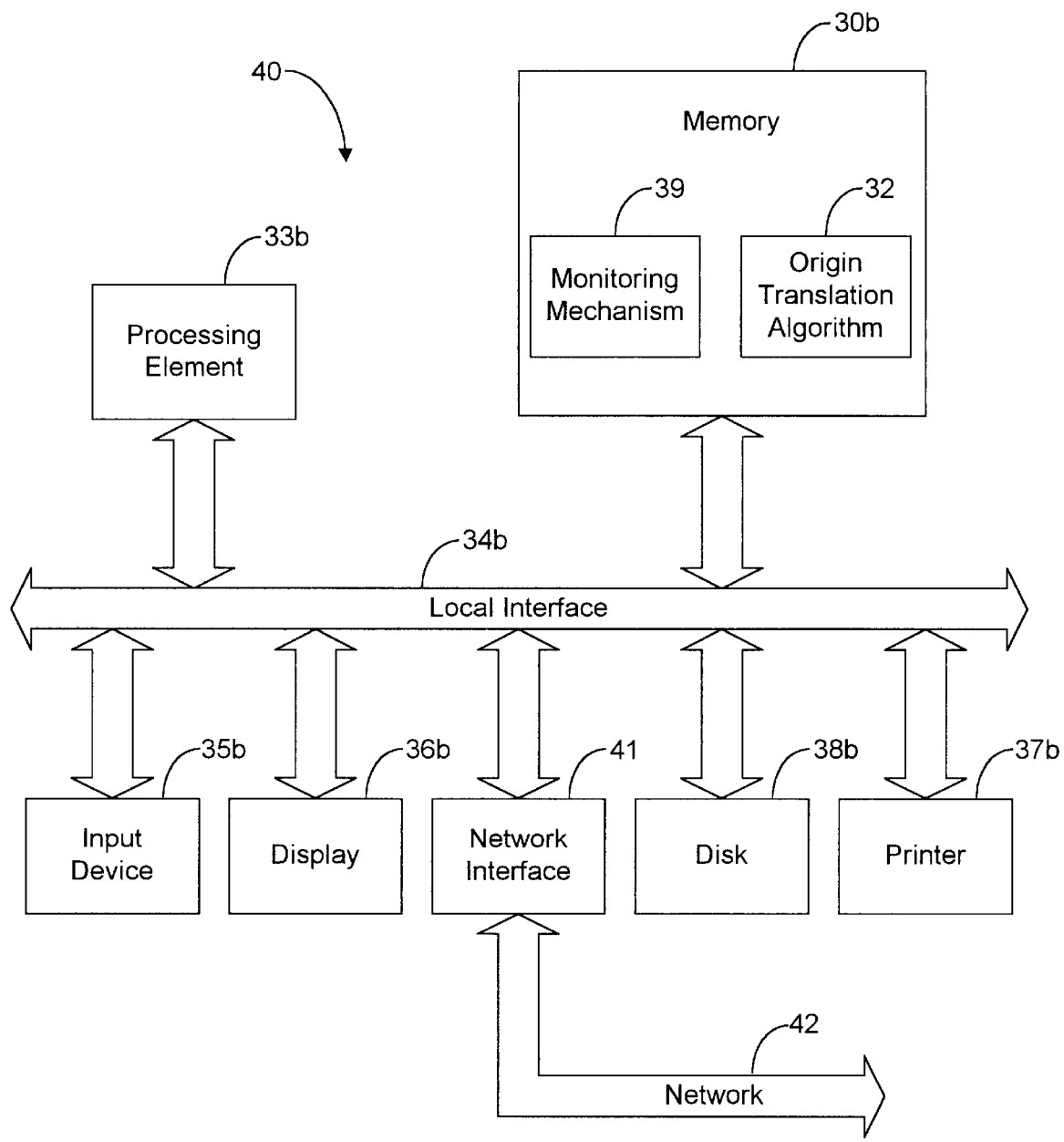
FIG. 3 is a block diagram illustrating an implementation of the monitoring mechanism of FIG. 1 in accordance with the preferred embodiment of the present invention.

When desired, translation mechanism 29 is configured to transmit travel data, including the vehicle's location, to base station 38. Base station 38 preferably includes a monitoring mechanism 39 designed to monitor the travel data of each vehicle 15 associated with the system 10. Preferably, monitoring mechanism 39 is implemented within a computer system 40, as depicted by FIG. 3. The computer system 40 can be similar to computer system 31, as can be seen by comparing FIG. 2 to FIG. 3. In this regard, the computer system 40 may include memory 30b for storing monitoring mechanism 39 and an origin selection algorithm 32, and the computer system 40 may also include processing element 33b, local interface 34b, input device 35b, display 36b, printer 37b, and disk 38b. In addition, it may be desirable for computer system 40 to include a network interface 41 that allows the system 40 to exchange data with a network 42. Preferably, monitoring mechanism 39 is configured to have knowledge of the location of each vehicle 15, as well as any other desirable information, such as the status of each delivery item associated with the system 10.

In order to transmit travel data, translation mechanism 29 (FIG. 1) is configured to transmit the travel data, via signal 43, to a communications device 44, which is capable of transmitting and receiving data to and from devices outside of vehicle 15. In this regard, communications device 44 is preferably a cellular modem configured to transmit and receive wireless signals to and from a cellular network 48. As known in the art, signals 45 are typically communicated with cellular network 48 via data packets. Each data packet typically includes a predetermined number of bits (e.g., thirty-two bits), and users of the cellular network 48 are usually charged a certain price for each data packet communicated.

The communications device 44 can transmit the travel data over the voice channels associated with the cellular network 48, as is done by most cellular modems of the prior art. However, in order to reduce the cost associated with transmitting the travel data through the cellular network 48, the travel data may be communicated through the cellular network 48 via a data or control channel. In this regard, the travel data can be encoded by altering identifiers of communications device 44, such as the mobile identification number (MIN) or electronic serial number (ESN), transmitted over a data channel of the cellular network 48. Alternatively, travel data can be appended to a feature request transmitted over the data channel. U.S. Pat. No. 5,771,445 entitled "Data Messaging in a Communications Network using a Feature Request," filed on Dec. 15, 1995, by Kennedy, III, et al., and U.S. Pat. No. 5,546,444 entitled "Methods and Apparatus for Communicating Data Via a Cellular Network Control Channel" filed on Mar. 11, 1994, by Roach, Jr., et al., which are both incorporated herein by reference, discuss the transmission of travel data over a data or control channel associated with cellular network 48 in further detail.

In order to transmit the travel data through a data channel by manipulating identifiers of the communications device 44, the MIN of communications device 44 is altered to include travel data, but the ESN remains fixed to be used as an identifier of the communications device 44. Therefore, after transmitting the identifiers through the data channel, the communications device 44 can be identified by the ESN, and the travel data can be determined from the MIN. Alternatively, the ESN of communications device 44 can be altered while the MIN is kept constant. It should be understood that the invention contemplates modification of the MIN, ESN, both the MIN and ESN, or other identifiers of the communications device 44 to accomplish the dual task of transmitting travel data and identifying the communications device 44.

Alternatively or in combination with the manipulation of the identifiers of the communications device 44, travel data can be communicated through the data channel by appending travel data to feature requests that are transmitted through the data channel. In this regard, most feature requests are generated by automatically or manually dialing the star key ("*") followed by a two-digit feature request identification code, and 29 digits of data. Therefore, for each feature request generated, 29 digits of travel data can be appended to the two-digit feature request identification code and sent over the data channel of the cellular network 48. Other embodiments may transmit different amounts of travel data following the feature request. By utilizing the manipulation of identifiers or the appending of travel data to feature requests, less data is transmitted through the voice channels of the cellular network 48, thereby reducing the cost of transmitting data through the cellular network 48.

Cellular network 48 is designed to transmit the travel data to a communications device 52. Although other embodiments are possible, cellular network 48 is preferably designed to transmit to communications device 52 via a public switched telephone network (PSTN) 55. In this regard, PSTN network 55 establishes a link between communications device 52 and cellular network 48, whereby cellular network 48 and communications device 52 can communicate via signals 61 and 65. Therefore, communications device 52 is preferably designed as a PSTN modem capable of communicating signals 65 between monitoring mechanism 39 and PSTN network 55. Although the preferred embodiment utilizes a cellular network 48 and a PSTN network 55 to communicate travel data to monitoring mechanism 39, one ordinarily skilled in the art should realize that other configurations are possible. For example, communications device 52 can be configured as a cellular modem capable of communicating signals directly with cellular network 48. Alternatively, utilization of communication networks 48 and 55 can be completely circumvented by configuring communications device 44 to communicate directly with communications device 52, for example. Any embodiment capable of communicating data between translation mechanism 29 and monitoring mechanism 39 should be suitable for implementing the principles of the present invention.

Monitoring mechanism 39 is designed to receive the travel data transmitted from translation mechanism 29 and to monitor the travel of the vehicle 15. When the vehicle 15 reaches a predetermined location (e.g., a certain distance from a particular destination), the monitoring mechanism 39 is designed to communicate a message to a user at a remote location 69, such as a user's premises, via PSTN network 55 and communications devices 52 and 72. In this regard, communications device 72 is preferably a PSTN modem capable of receiving the message from PSTN network 55 and of communicating the message to a message device 75. Message device 75 is configured to notify the user of the impending arrival of the vehicle 15. Preferably, message device 75 is a computer capable of displaying the notification through e-mail or some other communications software. Alternatively, message device 75 can be a telephone, a pager or any other device capable of notifying a user at location 69. It should be noted that communicating a message to a user at location 69 is not necessary for implementation of the present invention. For example, a user may obtain travel data of vehicle 15 directly from monitoring mechanism 39 through normal interface devices such as the display 35b or printer 36b associated with the monitoring mechanism 39.

As stated in the Background section hereinbefore, the signals 45 transmitted from vehicle 15 can be intercepted and deciphered by an unauthorized user even when the signal 45 is encrypted. Therefore, in accordance with the principles of the present invention, translation mechanism 29 is designed to modify the global coordinate values received from sensor 18 before transmitting the values to monitoring mechanism 39.

Figure 4:
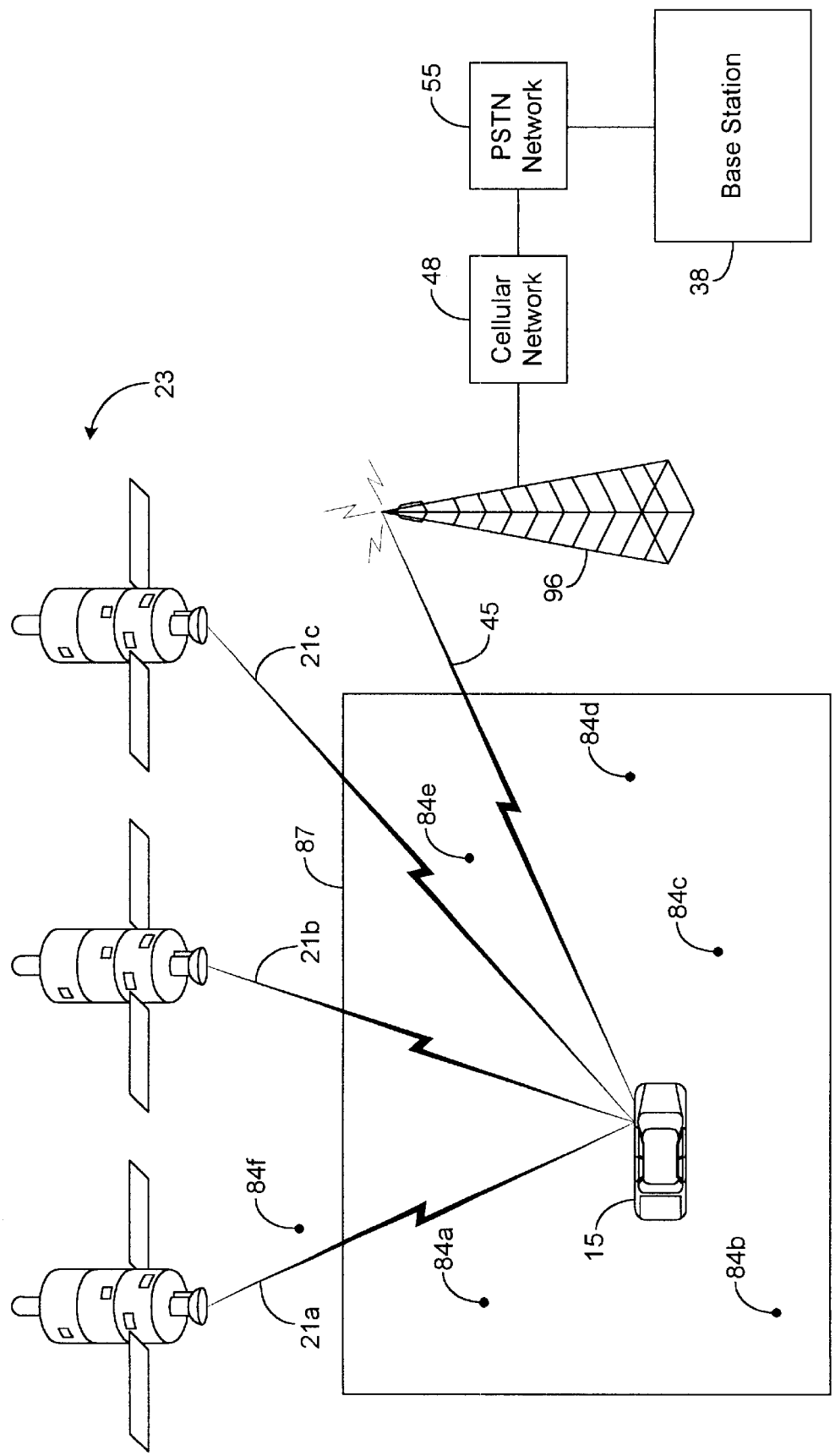
FIG. 4 is a schematic view illustrating the operation of the tracking system depicted in FIG. 1.

Referring to FIGS. 1 and 4, translation mechanism 29 is configured to select a local reference point 84a–84f and to transmit a location of the vehicle 15 relative to the local reference point rather than relative to the global reference point, which is at the intersection of the equator and the prime meridian in the preferred embodiment. In this regard, translation mechanism 29 is preferably configured to select a reference point 84a within an area 87 serviced by the vehicle 15, although selecting reference points outside of area 87 is also possible. Translation mechanism 29 is then configured to mathematically subtract the global coordinate values (relative to the predetermined reference point used to determine the global coordinate values of the vehicle 15 by sensor 18) of the local reference point 84a from the global coordinate values determined by sensor 18. As a result, new coordinate values are produced which represent a location of the vehicle 15 relative to the local reference point 84a.

Monitoring mechanism 39 is configured to have knowledge of the local reference point 84a. Therefore, monitoring mechanism 39 can either monitor the vehicle's location relative to the local reference point 84a, or the monitoring mechanism 39 can convert the received local coordinate values into global coordinate values relative to the global reference point. In order to convert the received coordinate values of vehicle 15 into global coordinate values, monitoring mechanism 39 is configured to mathematically add the global coordinate values of reference point 84a to the coordinate values received from translation mechanism 39. As a result, the location of vehicle 15 is expressed as global coordinate values relative to the reference point of the intersection of the equator and the prime meridian, in the preferred embodiment.

In order to monitor the vehicle's location relative to the local reference point 84a, the monitoring mechanism 39 should only compare the vehicle's location relative to the local reference point to other coordinate values of other locations that have had the global coordinate values of the local reference point 84a subtracted therefrom. For example, to determine the vehicle's distance from a predetermined location, the monitoring mechanism 39 is designed to subtract the global coordinate values of the local reference point 84a from the global coordinate values of the predetermined location before comparing the coordinate values of the predetermined location to the local coordinate values of the vehicle 15.

Since an unauthorized user is unaware of the global coordinate values of the local reference point 84a, the process of deciphering signals 45 becomes much more difficult. In order to further frustrate the deciphering of signals 45, the selection of the local reference point 84a can be systematically changed. For example, translation mechanism 29 can be configured to change the local reference point from 84a to 84b after a predetermined amount of time has elapsed or after the vehicle 15 reaches a predetermined location. Alternatively, translation mechanism 29 can be configured to change the local reference point from 84a to 84b upon detection of a signal transmitted from monitoring mechanism 39 to translation mechanism 29. Any methodology for determining which local reference point 84a, 84b, 84c, 84d, 84e or 84f should be selected is sufficient as long as monitoring mechanism 39 has knowledge of the current local reference point 84a–84f selected so that monitoring mechanism 39 can determine the current location of vehicle 15.

In the preferred embodiment, the algorithm for selecting the local reference points 84a–84f is stored in computer memory 30a (FIG. 2) of computer system 31 and computer memory 30b (FIG. 3) of computer system 40 as origin selection algorithm 32. Since the origin selection algorithm 32 is stored within both the translation mechanism 29 and the monitoring mechanism 39, the translation mechanism 29 and monitoring mechanism 39 can calculate or otherwise determine which local reference point 84a–84f is the current local reference point being utilized. However, since an unauthorized user should not have access to the algorithm 32, it should be difficult for the unauthorized user to determine which local reference point 84a–84f should be utilized. Therefore, changing which local reference point 84a–84f according to the algorithm 32 frustrates attempts by unauthorized users to determine the location of the vehicle 15 based on the signals 45, 61, and 65 transmitted between the vehicle 15 and the base station 38.

Modifying the coordinate values transmitted by translation mechanism 29, as described hereinabove, has the additional advantage of reducing the amount of data required to transmit signal 45. In this regard, subtracting the global coordinates of the local reference point 84 from the global coordinates received from sensor 18 reduces the values of the coordinates transmitted from translation mechanism 29. Therefore, the coordinate values transmitted can be represented with fewer bits of digital data. The closer the selected local reference point 84 is to the vehicle 15, the more the transmitted coordinate values are reduced.

By selecting a local reference point close enough to vehicle 15 such that the number of bits required to represent the vehicle's location is reduced below the number of bits transmitted in a packet of data, the overall cost of the system 10 can be reduced. For example, if a data packet communicated by cellular network 48 includes thirty-two bits, then the local reference point 84 should be selected such that subtraction of the local reference point 84a–84f from the coordinate values of any location within area 87 yields coordinate values represented by less than a total of thirty-two bits. Accordingly, each position of the vehicle 15 can be transmitted with a single data packet, thereby reducing the cost associated with the use of cellular network 48. Therefore, transmitting the location of vehicle 15 with coordinate values relative to a local reference point 84a–84f not only improves the security of data signal 45, but it also can reduce the overall cost of transmitting signals through cellular network 48.

The cost of transmitting the signal 45 through the cellular network 48 can be further reduced by utilizing the control channel associated with the cellular network 48 to transmit signal 45 through the cellular network. In this regard, U.S. Pat. No. 5,526,401 entitled "Methods and Apparatus for Acknowledging a Paging Message Via a Cellular Network Control Channel," which is incorporated herein by reference, describes a system and method for communicating data through the control channel of a cellular network.

OPERATION

Figure 5:
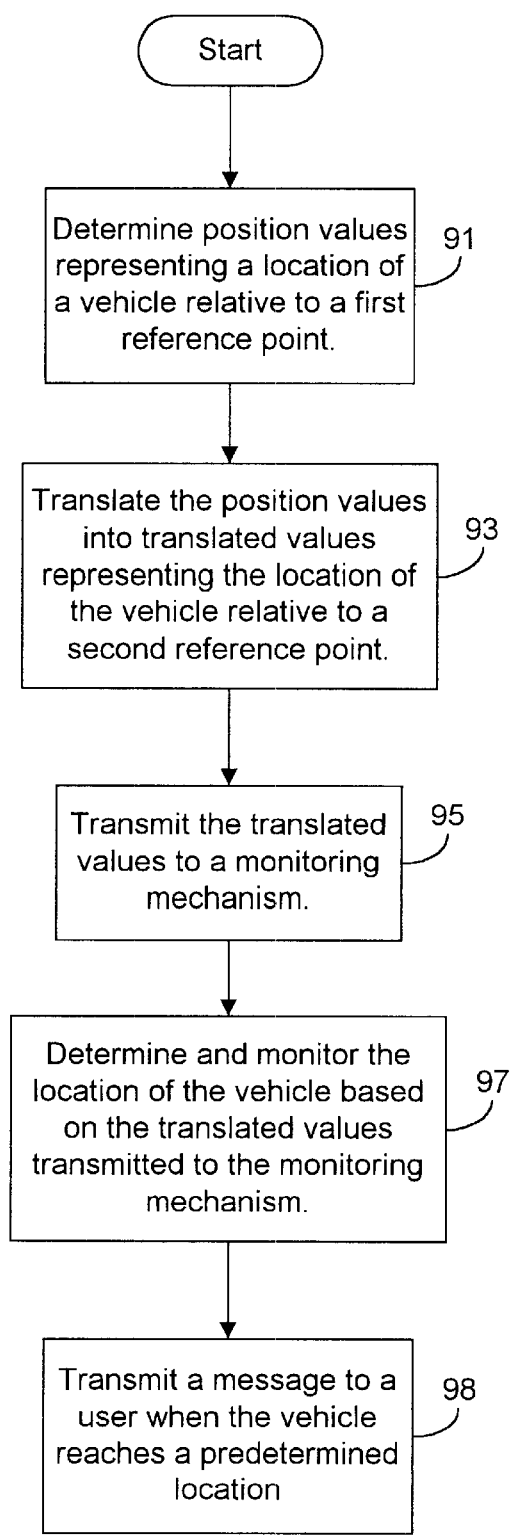
FIG. 5 is a flow chart illustrating a methodology for the tracking system of FIG. 1 in accordance with the preferred embodiment of the present invention.

The preferred use and operation of the tracking system 10 and associated methodology are described hereafter with reference to FIGS. 1, 4 and 5.

In block 91 of FIG. 5, GPS satellites 23 transmit a plurality of wireless signals 21a–21c to vehicle 15. The GPS sensor 18, through techniques known in the art, analyzes these signals to determine a position of the vehicle 15 relative to a global reference point (e.g., the intersection of the equator and the prime meridian). In this regard, sensor 18 determines coordinate values representing the position of the vehicle 15 relative to the global reference point. The sensor 18 then transmits these values to translation mechanism 29. For illustrative purposes only, assume that these coordinate values are 38 degrees and 10.5 minutes latitude and 28 degrees 20.0 minutes longitude.

Assuming that local reference point 84a (FIG. 4) is currently selected via origin selection algorithm 32 (FIGS. 2 and 3), translation mechanism 29, in block 93 of FIG. 5, translates the global coordinate values of the vehicle 15 into translated values by subtracting the global coordinate values of the local reference point 84a from the global coordinate values of the vehicle 15. In order to simplify the subtraction process, the translation mechanism 29 preferably translates the global reference values into a common unit. For example, in the preferred embodiment, the translation mechanism 29 translates the global coordinate values into seconds. Therefore, the translation mechanism 29 multiplies the minute value of a global coordinate value by 60 and multiplies the degree value of the global reference value by 3600. Then, the translation mechanism 29 adds the resulting values together to express the global coordinate value in terms of seconds. Accordingly, in the example mentioned hereinbefore, the global reference values are translated into 137430 seconds latitude and 102000 seconds longitude. Therefore, the translation mechanism 29 subtracts the coordinate values of the local reference point 84a from the foregoing coordinate values of 137430 seconds and 102000 seconds in order to translate the values into a translated set of values to be transmitted by communication device 44.

As an example, assume that if the global coordinate values of the local reference 84a point are 38 degrees and 0.0 minutes latitude and 28 degrees and 10.0 minutes longitude relative to the global reference point (i.e., the intersection of the equator and the prime meridian in the preferred embodiment). The closer the local reference point 84a is located to vehicle 15, the smaller the translated set of values will be when translation mechanism 29 subtracts the local reference point 84a from the global coordinate values of the vehicle 15. Moreover, the translation mechanism 29 translates the coordinate values of the local reference point 84a into the same units as the global coordinate values of the vehicle 15 (i.e., into seconds). Therefore, the aforementioned values of the local reference point are translated into the values of 136800 seconds latitude and 101400 seconds longitude in the preferred embodiment. Then, the translation mechanism 29 subtracts these values from the value of the global coordinate values of the vehicle 15 (i.e., 137430 seconds latitude and 102000 seconds longitude) to derive the translated set of values. In the example described hereinbefore, the translated set of values is, therefore, 630 seconds latitude and 600 seconds longitude (which are referred to hereinafter as the "translated set of values").

In block 95 of FIG. 5, translation mechanism 29 transmits, via communications device 44, the translated set of coordinate values to a cellular antenna 96 (FIG. 4) servicing area 87. As stated hereinbefore, each data packet transmitted through the cellular network 46 typically contains 32 bits of information. In the preferred embodiment, the first 15 bits indicate latitude, the second 15 bits indicate longitude, and the remaining bits indicate control or status information. Accordingly, in the preferred embodiment, the latitude value (expressed in binary form) of the translated set of values is input in the first 15 bits of data packet and the longitude value (expressed in binary form) is input into the next 15 bits of the data packet. The data packet is then transmitted by communication device 44 to cellular antenna 96. It should be noted that other protocols and methods of transmitting the translated set of values to monitoring mechanism 39 are possible.

If it is known that vehicle 15 will be operating in a particular area, then the local reference point 84a–84f can be selected to reduce the translated set of values to a predetermined number of bits. For example, assume that the vehicle services an area that is only located at locations having global coordinate values in the 38 degree latitude range. By selecting a local reference point 34a–34f with a 38 degree latitude value ensures that the translated value (produced from subtracting the latitude value of the local reference point 84a–84f from the latitude value of the vehicle 15) should not exceed 3599 seconds (the value of 59 minutes and 59 seconds). This is because the degree portion of the latitude value should always cancel out. Accordingly, it should be possible to represent the latitude with 12 bits regardless of the vehicle's location within the 38 degree latitude range. As a result, the first 12 bits of the data packet can be allocated to representing the latitude value instead of the 15 bits used in the preferred embodiment. Consequently, carefully selecting the local reference point 84a–84f can reduce the latitude value or the longitude value of the vehicle 15 to a predetermined number of bits during the translation process.

The cellular network 48 receives the data packet containing the translated set of coordinate values from cellular antenna 96 and transmits this data packet to monitoring mechanism 39 via PSTN network 55 and communication device 52. Monitoring mechanism 39 receives the translated set of coordinate values in the data packet and determines the vehicle's position based on the translated set of coordinate values, as depicted by block 97 of FIG. 5. Therefore, the monitoring mechanism 39 can monitor the vehicle's position relative to the local reference point 84a. Alternatively, the monitoring mechanism 39 can choose another reference point (e.g., reference point 84c) to monitor the vehicle's location, or the monitoring mechanism 39 can monitor the vehicle's position relative to the global reference point used by the GPS satellites 23.

In order to monitor the vehicle's location relative to the global reference point, monitoring mechanism 39 adds the global coordinate values of the local reference point 84a to the translated set of coordinate values received by the monitoring mechanism 39. This recovers the location of the vehicle 15 relative to the global reference point. For example, in the example described hereinabove, adding the global coordinate values of the local reference point 84a to the translated set of values recovers the values of 137430 seconds latitude (i.e., 38 degrees and 10.5 minutes latitude) and 102000 seconds longitude (i.e., 28 degrees and 20.0 minutes longitude). These recovered values indicate the location of the vehicle 15 relative to the global reference point (i.e., the intersection of the equator and the prime meridian in the preferred embodiment). Therefore, the monitoring mechanism 39 can utilize the recovered values in order to monitor the location of the vehicle 15 relative to the global reference point.

The monitoring mechanism 39 can monitor the vehicle's location by storing and analyzing the coordinate values transmitted from translation mechanism 29. The translation mechanism 29 can continuously transmit the vehicle's location, can periodically transmit the vehicle's location, or can transmit the vehicle's location on demand in response to a request transmitted from monitoring mechanism 39. Alternatively, the translation mechanism 29 can transmit the vehicle's location only when the translation mechanism 39 determines that the vehicle 15 is early or late a certain amount (e.g., five minutes or five miles) from a predetermined schedule known to both the translation mechanism 29 and the monitoring mechanism 39. In this regard, the monitoring mechanism 39 assumes that the vehicle 15 is on schedule, unless the monitoring mechanism 39 receives a transmission update from the vehicle 15.

Once the monitoring mechanism 39 determines that vehicle 15 is at a particular location (e.g., a location that is five minutes from the destination of the vehicle 15), the monitoring mechanism 39 sends a message to a user at remote location 69 (e.g., a user's premises) indicating an impending arrival of the vehicle at the destination or other particular location, as depicted by block 98 of FIG. 5. Alternatively, the monitoring mechanism 39 can send data pertaining to the vehicle's location on demand in response to a request from a user at base station 38 or at remote location 69. Also, monitoring mechanism 39 can send location information regarding other vehicles to vehicle 15 either continuously, periodically or on demand.

To further protect the integrity of the system 10, translation mechanism 29 can change the local reference point 84a used to translate the location data. For example, translation mechanism 29 can stop using the global coordinate values of local reference point 84a to translate the coordinates transmitted to monitoring mechanism 39 and start using the global coordinate values of local reference point 84b, 84c, 84d, 84e or 84f instead. However, in order for monitoring mechanism 39 to determine the correct location of the vehicle 15, both the translation mechanism 29 and the monitoring mechanism 39 should utilize the same local reference point 84a–84f to process each sample of data communicated between the two mechanisms 29 and 39. Therefore, both the translation mechanism 29 and monitoring mechanism 39 are preferably aware of the reference point 84a–84f currently selected.

For example, the translation mechanism 29 and the monitoring mechanism 39 can change to a new local reference point 84a–84f at predetermined times known to both translation mechanism 29 and monitoring mechanism 39. In this regard, an algorithm 32 (FIGS. 2 and 3) can be established which both of the mechanisms 29 and 39 can use to calculate or otherwise determine the values of the correct local reference point 84a–84f. For example, the algorithm 32 can specify that translation mechanism 29 and monitoring mechanism 39 be configured to change in a predetermined order which local reference point 84a–84f is selected each hour or at other predetermined times. The algorithm 32 also can specify that the local reference point 84a–84f should change to a particular local reference point 84a–84f when the vehicle 15 reaches a predetermined location. The algorithm can also specify a formula for calculating the current local reference point 84a–84f according to a set of predetermined rules. Alternatively, one of the mechanisms 29 or 39 can communicate the correct local reference point 84a–84f or other information to the other mechanism 29 or 39 when the local reference point 84a–84f is to change, and in response to this signal, the mechanisms 29 and 39 can select the current local reference point 84a–84f according to the algorithm 32. It should be apparent to one skilled in the art upon reading this disclosure that other implementations are possible to ensure that both mechanisms 29 and 39 are aware of the local reference point 84a–84f currently selected for use by the system 10.

By utilizing different local reference points 84a–84f to transmit coordinates defining the location of vehicle 15, the system 10 helps to ensure that unauthorized users can not intercept and decipher the signals used to notify monitoring mechanism 39 of the location of vehicle 15. Furthermore, the amount of data needed to transmit the location of vehicle 15 can be significantly reduced by subtracting the local reference points 84a–84f from the coordinate values of the vehicle 15 supplied by the sensor 18. Therefore, the tracking system 10 and associated methodology not only help to ensure the privacy of information sent to monitoring mechanism 39, but the system 10 and methodology also help to reduce the cost associated with the tracking of a vehicle 15.

It should be noted that it is not necessary for the global reference point discussed herein to be located at the intersection of the equator and the prime meridian. This global reference point is selected in the preferred embodiment because current GPS systems utilize the intersection of the equator and prime meridian as their reference point. It should be apparent to one skilled in the art that other locations for the global reference point are possible without departing from the principles of the present invention.

Furthermore, although the preferred embodiment utilizes coordinate values (i.e., latitude and longitude) to represent the location of vehicle 15 and other locations, other types of value(s) may be utilized instead. However, it should be possible for one skilled in the art to implement the principles of the present invention regardless of the type of value(s) utilized.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A tracking system for determining a location of a vehicle, comprising:

a sensor configured to determine a first coordinate value that represents a location point of said vehicle; and a translation mechanism configured to receive said first coordinate value and to translate said first coordinate value into a translated value by mathematically combining said first coordinate value with a second coordinate value, said second coordinate value representing another location point, said translation mechanism further configured to transmit said translated value to a monitoring mechanism over a wireless channel of a communication network, said monitoring mechanism configured to track said vehicle based on said translated value, wherein said translation mechanism is configured to translate said first coordinate value such that said translated value is defined by a smaller number of data bits than said first coordinate value thereby reducing a number of data packets transmitted by said translation mechanism and said communication network to inform said monitoring mechanism of said vehicle location point.

2. The system of claim 1, wherein said network is cellular, and wherein said channel is a control channel of said cellular network.

3. The system of claim 1, wherein said translation mechanism is configured to subtract said second coordinate value from said first coordinate value in order to determine said translated value.

4. The system of claim 1, wherein said sensor is a global positioning sensor configured to receive a plurality of signals from a plurality of satellites of a global positioning system (GPS) and to determine said first coordinate value based on each of said signals transmitted from said plurality of satellites.

5. The system of claim 1, wherein said monitoring mechanism is configured to mathematically combine said second coordinate value with said translated value in order to determine said first coordinate value.

6. The system of claim 1, wherein said monitoring mechanism is configured to determine when said vehicle is within a specified proximity of a particular location based on said translated value and to transmit a message to a user in response to a determination by said monitoring mechanism that said vehicle is within said specified proximity of said particular location.

7. The system of claim 4, wherein said translation mechanism is further configured to subtract said second coordinate value from said first coordinate value in order to determine said translated value and said monitoring mechanism is further configured to add said second coordinate value to said translated value.

8. The system of claim 5, wherein said sensor is coupled to said vehicle.

9. The system of claim 7, wherein said monitoring mechanism is located at a tracking base and said vehicle is located at a remote location.

10. The system of claim 3, wherein:

said sensor is configured to determine another coordinate value that represents another location point of said vehicle;

said translation mechanism is configured to select another location point via a predefined algorithm and to determine a third coordinate value based on said selected location point, said translation mechanism further configured to translate said other coordinate value into a second translated value by mathematically combining said other reference value with said other coordinate value, said translation mechanism further configured to transmit said second translated value to said monitoring mechanism; and said monitoring mechanism is configured to track said vehicle based on said second translated value.

11. The system of claim 3, wherein:

said sensor is configured to determine a plurality of other coordinate values, each of said other coordinate values representing a different location point of said vehicle; and said translation mechanism is configured translate said plurality of other coordinate values into a plurality of other translated values by subtracting said second coordinate value from each of said plurality of other coordinate values, said translation mechanism further configured to transmit each of said other translated values to said monitoring mechanism.

12. The system of claim 6, wherein:

said first coordinate value is indicative of a distance of said sensor from a reference point and said translated value is indicative of a distance of said sensor from said other location point; and said monitoring mechanism is further configured to determine when said vehicle is within said specified proximity by comparing said translated value to a coordinate value that is indicative of a distance of said particular location from said other location point.

13. A system for tracking vehicles, comprising:

means for determining, at a vehicle, a first coordinate value of said vehicle relative to a first reference point said first coordinate value indicative of a distance from said vehicle to said first reference point;

means for selecting a second reference point;

means for calculating, at said vehicle, a second coordinate value of said vehicle relative to said second reference point based on said first coordinate value, said second coordinate value indicative of a distance from said second reference point to said vehicle and represented with a fewer number of bits than said first coordinate value means for wirelessly communicating said second coordinate value; and means for receiving said second coordinate value communicated by said communicating means and for determining at a base station said location of said vehicle based on said second coordinate value, said base station remotely located from said vehicle.

14. The system of claim 13, wherein said communicating means includes a means for transmitting said second coordinate value through a control channel of a cellular network.

15. The system of claim 13, wherein said base station determining means includes a means for calculating said first coordinate value based on said second coordinate value.

16. The system of claim 13, wherein said calculating means includes a means for mathematically combining a third coordinate value representing a location of said second reference point with said first coordinate value.

17. The system of claim 13, wherein said determining means is configured to determine when said vehicle is within a specified proximity of a particular location and wherein said system further comprises a means for automatically transmitting a message to a user in response to a determination by said base station determining means that said vehicle is within said specified proximity of said particular location.

18. The system of claim 13, wherein said calculating means includes a means for subtracting a coordinate value representing a location of said second reference point from said first coordinate value.

19. The system of claim 15, further comprising a means for systematically changing a location of said second reference point.

20. The system of claim 15, wherein said first reference point is a global reference point and said second reference point is a local reference point.

21. The system of claim 16, wherein said base station determining means includes a means for mathematically combining said second coordinate value with said third coordinate value.

22. The system of claim 17, wherein said user is located at a remote location.

23. The system of claim 18, wherein said base station determining means includes a means for adding said second coordinate value to said third coordinate value.

24. The system of claim 17, wherein said vehicle determining means includes a global positioning system (GPS) sensor, said GPS sensor configured to receive a plurality of signals from a plurality of GPS satellites and to determine said first coordinate value based on each of said plurality of signals from said plurality of satellites.

25. The system of claim 17, wherein said base station determining means is configured to determine whether said vehicle is within said specified proximity by comparing said second coordinate value to a third coordinate value, said third coordinate value representing a distance from said second reference point to said particular location.

26. The system of claim 25, wherein said calculating means includes a means for subtracting said third coordinate value from said first coordinate value.

27. A method, comprising the steps of:
determining a first coordinate value of a vehicle relative to a first predetermined reference point, said first coordinate value indicative of a distance from said vehicle to said first reference point;
selecting a second reference point;
translating said first coordinate value into a second coordinate value of said vehicle relative to said second reference point, said second coordinate value represented with a fewer number of bits than said first coordinate value and indicative of a distance from said second reference point to said vehicle;
transmitting said second coordinate value to a monitoring mechanism tracking said vehicle; and
tracking said vehicle based on said second coordinate value.

28. The method of claim 27, further comprising the step of transmitting said second coordinate value via a control channel associated with a cellular network.

29. The method of claim 27, further comprising the steps of:
representing a location of said second reference point relative to said first reference point with a third coordinate value; and
combining said third coordinate value with said first coordinate value in said translating step.

30. The method of claim 27, further comprising the steps of:
representing a location of said second reference point relative to said first reference point with a third coordinate value; and
subtracting said third coordinate value from said first coordinate value in performing said translating step.

31. The method of claim 29, further comprising the step of transmitting a message to a user at a remote location in response to a determination that said vehicle is within a specified proximity of a particular location.

32. The method of claim 29, further comprising the step of combining said second coordinate value with said third coordinate value to recover said first coordinate value.

33. The method of claim 30, further comprising the step of systematically changing said location of said second reference point.

34. The system of claim 12, wherein said translation mechanism is configured to subtract said reference value from said coordinate value in order to determine said translated value.

35. The method of claim 27, wherein said selecting step is based on a proximity of said second coordinate value to an expected area of travel of said vehicle.

36. A method, comprising the steps of:
receiving at least one wireless signal via a location sensor on a vehicle;
determining a first coordinate value of said vehicle based on said at least one signal, said first coordinate value indicative of a location of said vehicle from a first reference point;
selecting a second reference point;
translating said first coordinate value into a translated coordinate value, said translated coordinate value indicative of said vehicle location from said second reference point;
communicating said vehicle location to a monitoring mechanism tracking said vehicle by transmitting said translated coordinate value via at least one data packet over a wireless channel of a communication network to said monitoring mechanism; and
tracking said vehicle, via said monitoring mechanism, based on said translated coordinate value,
wherein said translated coordinate value has a smaller number of data bits than said first coordinate value thereby enabling said communicating step to be performed with a reduced number of data packets transmitted over said channel.

37. The method of claim 36, wherein said selecting step is based on an expected area of travel of said vehicle.

38. The method of claim 37, wherein said translating step includes the step of subtracting a coordinate value of said second reference point from said first coordinate value.

* * * * *